UNITED STATES PATENT OFFICE.

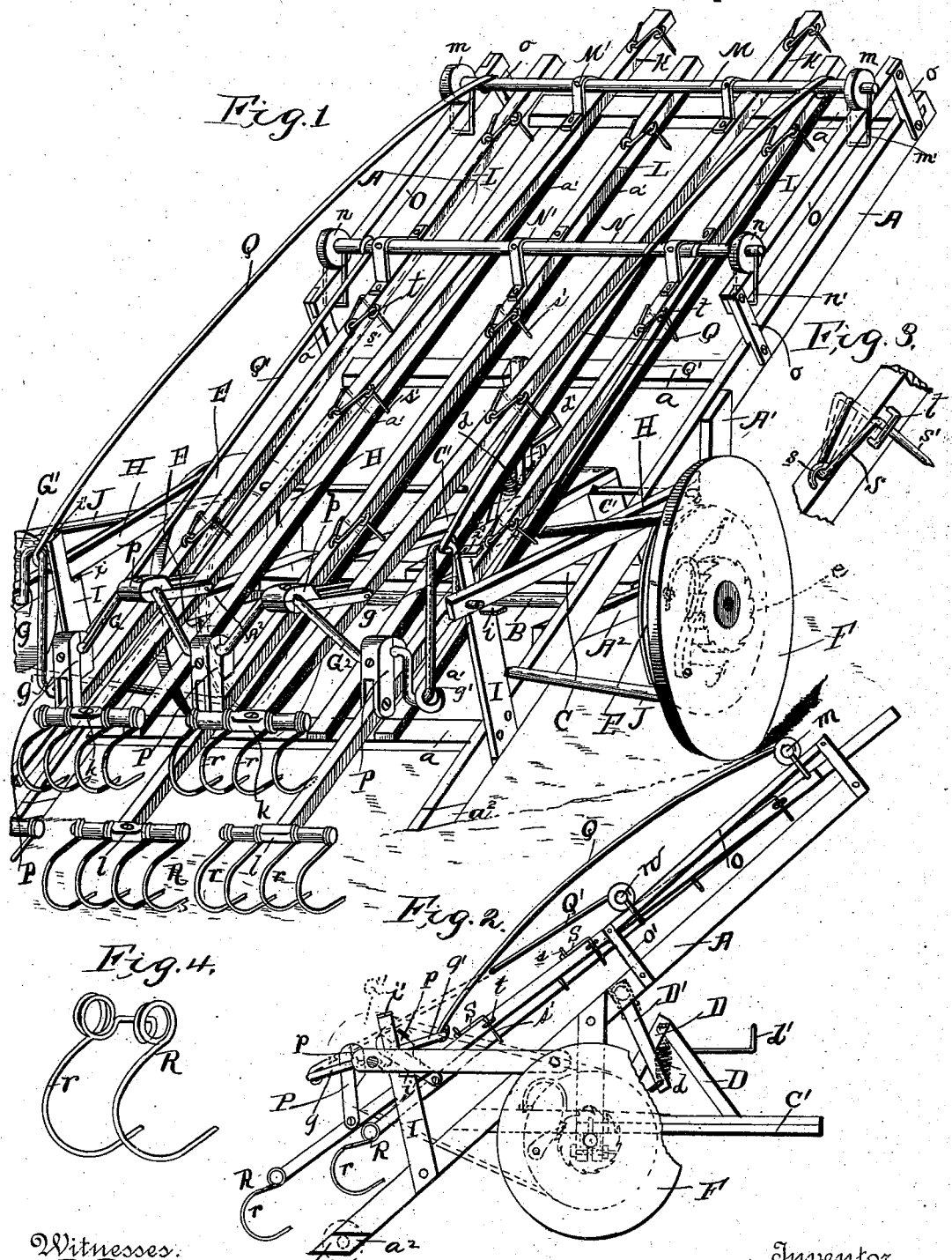

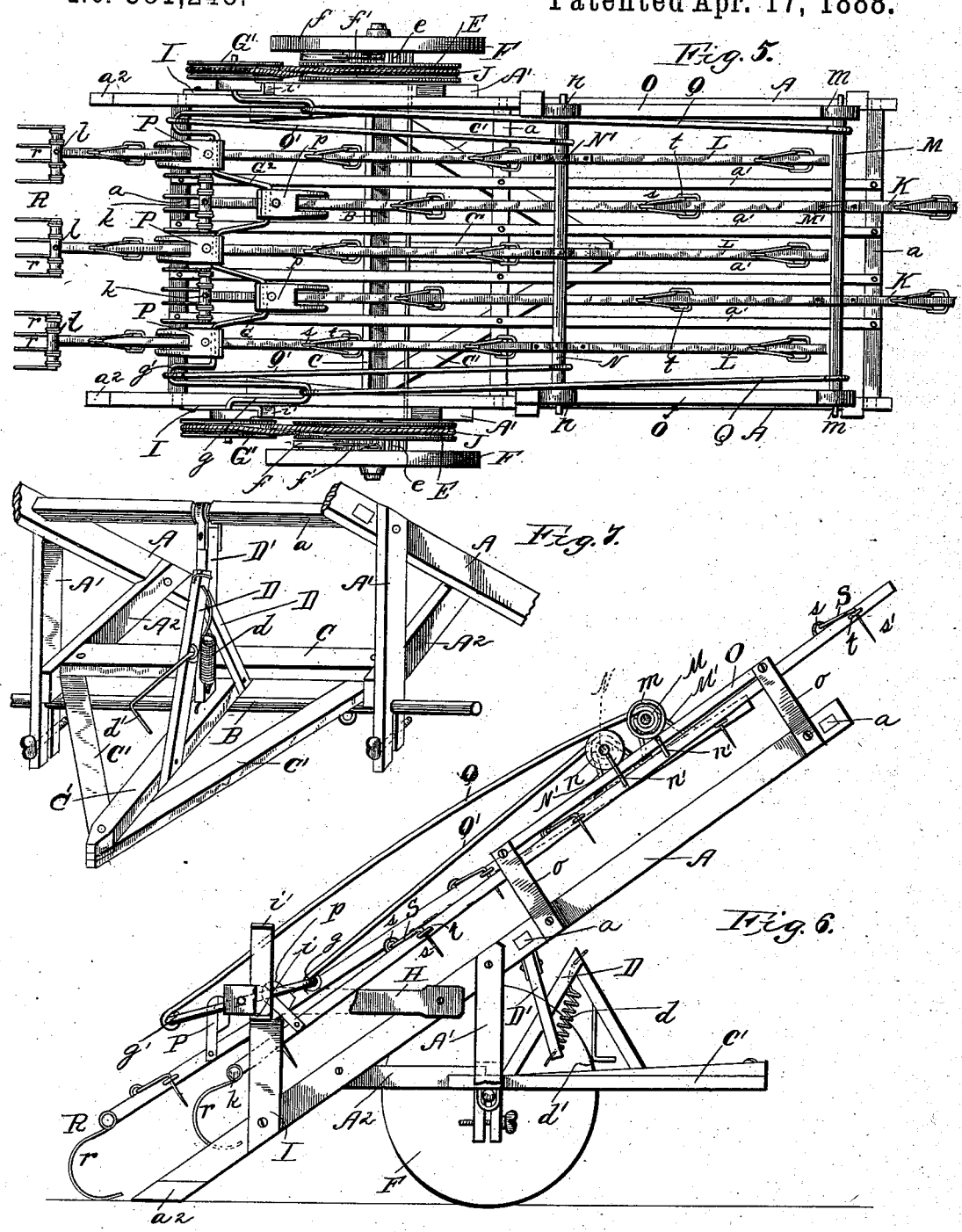

CHARLES C. JEWETT AND DEWITT C. JEWETT, OF SAND SPRING, IOWA.

HAY-LOADER.

SPECIFICATION forming part of Letters Patent No. 381,248, dated April 17, 1888.

Application filed October 27, 1886. Serial No. 217,348. (No model.)

*To all whom it may concern:*

Be it known that we, CHARLES C. JEWETT and DEWITT C. JEWETT, citizens of the United States, residing at Sand Spring, in the county of Delaware and State of Iowa, have invented certain new and useful Improvements in Hay-Loaders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hay-loaders of that class which gathers the hay from the ground and elevates it over an inclined platform and delivers it upon the wagon by means of reciprocating and vibrating rakes.

The improvements consist in the novel features more fully hereinafter set forth, claimed, and shown in the annexed drawings, in which—

Figure 1 is a rear perspective view of a hay-loader embodying our invention. Fig. 2 is a side view, parts broken away. Fig. 3 is an enlarged view of one of the elevator-teeth. Fig. 4 is a perspective view of one of the rake-teeth. Fig. 5 is a plan view. Fig. 6 is a side detail view showing the operation of the cranks. Fig. 7 is a detail view of the draft-frame.

The incline over which the hay passes consists of side rails, A, united by cross-bars $a$, to which are fastened the slats $a'$, over which the hay travels. To each of the side rails are attached two short bars, A' A². The bar A' extends in a downward direction, and the bar A² projects forward and intersects the bar A' at a short distance from the incline. These bars are fixedly secured to the axle B at their point of intersection, so that the incline in its movements will cause the axle to turn therewith. The lower ends of the side rails, A, are adapted to trail upon the ground, so that the incline will accommodate itself to any unevenness of the ground over which the device passes. To prevent a too great wear the lower ends of the said rails will be provided with the shoes $a^2$, as shown by full lines in Fig. 2, or they may be provided with wheels, as shown by dotted lines in the same figure. By having the rails of the incline trail upon the ground the rakes are at all times kept at a proper distance from the ground and the teeth prevented from being forced into the ground at one time, as when passing over a ridge or hill, and again from not touching the ground, as when passing over a rut or gulley.

The draft-frame comprises the bolster C and the central and side bars, C'. The side bars incline toward each other and intersect with the central bar at a distance from the bolster, as shown. The draft is applied to this point, which may be provided with a clevis, (not shown;) or it may be connected with a wagon in any well-known manner. The bolster is preferably located above the axle, and is pivotally connected therewith in such manner that the up-and-down movement will in no manner affect or impart any motion to the axle. The standards D, two in number, attached at their lower ends to the middle bar of the draft-frame, approach each other and are united at their upper ends, to which ends the coil-spring $d$ is secured at one end, and has its opposite end fastened to the lower end of the link D', depending from the incline and pivotally connected at its upper end with one of the cross-bars $a$. This spring holds the lower ends of the side rails upon the ground and prevents the tilting of the incline when loaded near its upper end, as will be readily understood. The hook $d'$, connected with the standards D, is adapted to catch over one of the cross-bars of the incline and hold the same down upon the standards when transporting the device from place to place. By this means the incline and rakes will be supported clear of the ground.

A grooved pulley, E, is loosely mounted upon each end of the axle, and has a ratchet-wheel, $e$, secured to its outer side, the teeth of which are adapted to be engaged by the pawl $f$, secured to the inner side of the drive-wheel F. The spring $f'$, secured at its outer end to said drive-wheel, has its free end bearing upon the pawl to hold it in contact with the ratchet-wheel. By this means during the forward movement of the drive-wheel the grooved pulley is carried forward with it; but during the backward movement of the drive-wheel said pulley will remain stationary.

The crank-shaft G is mounted in the outer ends of the links H, which are pivoted at their inner ends to the side rails of the incline and have their outer ends supported upon the stops $i$, projecting laterally from the standards I, projecting upward from the incline. Said crank-shaft is provided at each end with two oppositely-disposed cranks, $g$ and $g'$, which extend in opposite directions, for the purpose presently to be described. The outer ends, which extend beyond the links H, have grooved pulleys G' keyed thereto, around which and the grooved pulley E an endless band, J, passes and communicates motion from said pulley E to the crank-shaft.

The rake-bars K and L are divided into two sets, which are alternately driven, and are so disposed that the rake-bar of one set is intermediate two adjacent rake-bars of the opposite set, as shown. Each set is fixedly connected at the forward ends with the cross-bars M and N, respectively, by the brackets $m'$ and $n'$, as shown. These cross-bars extend transversely across the incline, and are supported at each end upon elevated ways O, secured to the side rail of the incline by the uprights $o$.

The rollers $m$ and $n$, mounted upon the end of the cross-bars, are adapted to travel upon the ways and relieve the friction. Said cross-bars are held in position upon the ways by the yokes $m'$ and $n'$, which embrace said ways and are connected at their free ends with the cross-bars on each side of the rollers. These yokes, in addition to holding the cross-bars upon the ways, prevent any longitudinal movement of the rollers, as will be readily comprehended. The rear ends of said rake-bars are supported by and connected with the crank-shaft by the swinging hangers P, which are bifurcated at their lower ends and embrace the rake-bars, and are provided at their upper ends with the removable piece $p$, between which and the hanger the crank-shaft is journaled or has a bearing. Said rake-bars are driven from the crank-shaft by the pitmen Q and Q', interposed between and connecting the oppositely-disposed cranks $g$ and $g'$ with the cross-bars M and N, respectively. The throw of the cranks $g$ and $g'$ is much greater—nearly double—the throw of the cranks $G^2$, which support the rear ends of the rake-bars; hence the necessity of the hangers P being journaled upon the cranks $G^2$, composing the crank-shaft G, to compensate for the variation or difference in throw between the two sets of cranks, as will be readily appreciated. Said cranks $g$ and $g'$ extend in opposite directions, so that each set of rake-bars will be simultaneously moved in opposite directions, so that while one set of rakes is carrying the hay forward the set previously operating is being carried back for a fresh supply. The rake-bars have an independent movement to and from the incline to accommodate themselves to the bulk of hay passing between them and the incline by reason of the crank-shaft being journaled in the pivoted links. This movement is limited by the stops $i'$, which extend laterally from the standards I in the same direction as the stops $i$, sufficient space being allowed between said stops $i$ and $i'$ for a limited movement of the links.

The rake-bars are provided at their lower ends with rake-heads $k$ and $l$, which extend laterally from each side and are provided with rakes R. These rakes are composed of a single wire, doubled on itself near its middle and coiled, forming the tines $r$. The coiled portion is slipped over the rake-head, and gives sufficient elasticity to the tines to permit their yielding when striking against a hard substance, so that they may ride over the same without doing any injury. That part of the wire uniting the tines is secured to the rake-head in any suitable manner. The rake-heads and rakes of one set of rake-bars are longer than the distance between or project beyond the approximate ends of two adjacent rake-heads of the opposite set of rake-bars. By this construction the ground is thoroughly raked, as will be readily comprehended.

The elevator-teeth are each composed of a single wire, folded upon itself near its middle, which portion is adapted to rest upon the top of the rake-bar and be pivotally connected therewith, preferably by the staple $s$, driven over the folded end. The outer portions are adapted to embrace the sides of the rake-bar, and are bent down on each side thereof and held in place by the guides $t$, secured to each side of the rake-bar. A sufficient space is allowed within the guide for the forward ends of the teeth S to move in, so that during the forward movement of the rake-bar the arms $s'$ will be held substantially at right angles to the rake-bar and carry the hay forward, and during the retrograde movement of said rake-bar said arms $s'$ will turn up out of the way and ride over the hay previously elevated without carrying the same backward.

Having thus described our invention, what we claim, and desire to secure by Letters Patent, is—

1. The combination, with the crank-shaft and the rake-bars, of the hangers journaled at their upper ends to the crank-shaft and pivotally connected at their lower ends with the rake-bars, substantially as set forth.

2. The combination, with the rake-bar and the crank-shaft, of the swinging hanger interposed between the crank-shaft and rake-bar and supporting the latter, and the pitman connecting the crank-shaft with the cross-bar, substantially as described, and for the purpose set forth.

3. The combination, with the two sets of alternately-driven rake-bars and the crank-shaft having two oppositely-disposed cranks of greater length than the cranks composing the crank-shaft, of the swinging hangers connecting said rake-bars with the crank-shaft, and the pitmen connecting each of said oppositely-disposed cranks with the cross-bars, respectively, substantially as set forth.

4. The combination of the incline having elevated ways on each side, the cross-bars held to and working upon said ways, the two sets of alternately-driven rake-bars having the rake-bars of each set connected with one of the cross-bars, the crank-shaft having oppositely-disposed cranks at each end, the swinging hangers supporting said rake-bars from the crank-shaft, and the pitmen connecting each of said cranks with the cross-bars, substantially as set forth.

5. The combination, with the two cross-bars, the rake-bars, and the crank-shaft having two oppositely-disposed cranks of greater length than the remaining cranks composing the crank-shaft, of the pitmen connecting each of said oppositely-disposed cranks with the cross-bars, substantially as and for the purpose described.

6. The combination of the draft-frame having a standard, the axle, the incline fixedly secured upon the axle and having a depending link, the spring interposed between the standard and link, the ways, the cross-bars, the two sets of alternately-driven rake-bars, the crank-shaft having two oppositely-disposed cranks at each end, the swinging hangers, the pitmen between the cross-bars and cranks, the standards having lateral stops, and the pivoted links supporting the crank-shaft at their outer ends, substantially as set forth.

In testimony whereof we affix our signatures in presence of two witnesses.

CHARLES C. JEWETT.
DEWITT C. JEWETT.

Witnesses:
R. U. RICKLEFS,
F. G. WOOD.